United States Patent
Baumann et al.

(10) Patent No.: US 6,923,948 B2
(45) Date of Patent: Aug. 2, 2005

(54) COMBINED HEAT AND POWER PLANT AND A PROCESS FOR THE OPERATION THEREOF

(75) Inventors: Frank Baumann, Alzenau (DE); Stefan Wieland, Offenbach (DE); Peter Britz, Allendorf (DE); Klaus Heikrodt, Allendorf (DE)

(73) Assignees: Viessmann Werke GmbH & Co. KG, Allendorf (DE); Umicore AG & Co. KG, Hanau-Wolfgang (DE)

( * ) Notice: Subject to any disclaimer, the term of this patent is extended or adjusted under 35 U.S.C. 154(b) by 427 days.

(21) Appl. No.: 10/109,152

(22) Filed: Mar. 27, 2002

(65) Prior Publication Data

US 2002/0150799 A1 Oct. 17, 2002

(30) Foreign Application Priority Data

Mar. 31, 2001 (EP) .............................................. 01108230
Dec. 22, 2001 (EP) ........................................... 011307923

(51) Int. Cl.$^7$ ................................................. C01B 3/26
(52) U.S. Cl. ....................... 423/651; 252/373; 422/190; 422/211; 429/12
(58) Field of Search ........................ 48/198.3; 252/373; 422/190, 211; 423/651, 652, 655; 429/12

(56) References Cited

U.S. PATENT DOCUMENTS

| | | | |
|---|---|---|---|
| 3,438,759 A | * 4/1969 | Meek et al. | ................ 48/127.9 |
| 3,488,171 A | 1/1970 | Baker et al. | |
| 3,539,395 A | 11/1970 | Bartas et al. | |
| 3,615,164 A | * 10/1971 | Baker et al. | ............. 252/182.1 |
| 3,615,217 A | * 10/1971 | Brien et al. | ................. 423/656 |
| 3,615,850 A | 10/1971 | Chludzinski et al. | |
| 5,997,594 A | 12/1999 | Edlund et al. | |
| 6,190,623 B1 | 2/2001 | Sanger et al. | |

FOREIGN PATENT DOCUMENTS

| | | |
|---|---|---|
| DE | 40 05 468 A1 | 8/1991 |
| EP | 0 959 512 A1 | 11/1999 |
| EP | 1 033 769 A1 | 9/2002 |

OTHER PUBLICATIONS

European Search Report, OMG AG & Co. KG, Oct. 2, 2001.

* cited by examiner

Primary Examiner—Stanley S. Silverman
Assistant Examiner—Meribel Medina
(74) Attorney, Agent, or Firm—Kalow & Springut LLP

(57) ABSTRACT

The invention provides a combined heat and power plant with an integrated gas production system. The combined heat and power plant contains a steam reformer heated with a gas burner which converts a mixture of hydrocarbons and water vapour into a reformate gas stream containing hydrogen and carbon monoxide. The plant further contains a reactor system with several stages for removing carbon monoxide from the reformate gas stream. The plant also contains a heat exchanger for removing heat energy from the reformate gas stream and a fuel cell unit for producing electrical energy by catalytic reaction of the hydrogen contained in the reformate gas with oxygen in the fuel cell, wherein the reformate gas stream is supplied to the anode in the fuel cell unit and the anode waste gas is taken to the gas burner of the steam reformer as fuel, via a gas pipe. The reactor system for removing carbon monoxide from the reformate gas stream contains, according to one embodiment of the invention, a low temperature shift reactor and a downstream methanisation reactor and the heat exchanger for cooling the reformate gas stream leaving the steam reformer to the inlet temperature of the low temperature shift reactor is located in the reformate gas stream between the steam reformer and the low temperature shift reactor. This combined heat and power plant is operated according to the invention in such a way that the reformate gas contains 5 to 10 vol. % of unreformed hydrocarbon which enables the flame in the gas burner to be monitored using an ionisation detector when burning the anode waste gas in the gas burner of the steam reformer.

14 Claims, 4 Drawing Sheets

COMBINED HEAT AND POWER PLANT AND A PROCESS FOR THE OPERATION THEREOF

FIELD OF THE INVENTION

This invention relates to the field of combined heat and power plants with integrated gas production systems. The combined heat and power plants of the present invention safely and efficiently produce heat and electrical energy.

BACKGROUND OF THE INVENTION

In general, the problem associated with heat and power plants is the ability to effectively reduce carbon monoxide, a toxic gas, to a non-toxic level. There are three reactions that take place before the fuel cell can produce electrical energy.

The hydrogen required to operate a fuel cell unit can be obtained in a downstream gas production system by the reforming of hydrocarbons. Steam reforming of hydrocarbons to produce hydrogen is a known process. In accordance with equation (1), a reformate gas is formed which contains hydrogen and carbon monoxide. In equation (1), methane is used as an example of a hydrocarbon.

$$\text{Steam reforming } CH_4 + H_2O \rightarrow 3H_2 + CO \qquad (1)$$

Steam reforming in accordance with equation (1) is normally performed so that optimum amount of methane is reacted. This requires high operating temperatures in the steam reformer, between 700 and 800° C.

Since the carbon monoxide contained in the reformate gas is a strong catalyst poison for the anode catalysts in fuel cells, it has to be removed as much as possible. The carbon monoxide contained in the reformate gas is therefore generally reacted with water to give hydrogen and carbon dioxide in accordance with equation (2) (the water gas shift reaction).

$$\text{Water gas shift reaction } CO + H_2O \rightarrow H_2 + CO_2 \qquad (2)$$

Two shift reactions are frequently used in order to react the carbon monoxide as much as possible. A high temperature shift reaction occurs at temperatures between 350 and 450° C. and a low temperature shift reaction occurs at temperatures between 180 and 250° C. Cooling the reformate gas to the relevant operating temperatures prior to entering the shift reactors is achieved with the aid of heat exchangers. The heat extracted from the reformate gas by the heat exchanger may be used to heat buildings.

However, when using shift reactions, the concentration of carbon monoxide in the reformate gas can be reduced only to the relevant equilibrium concentration at the particular reaction temperature. This is about 0.5 vol. % for the low temperature shift reaction at an operating temperature in the range 180 to 250° C. This concentration of carbon monoxide is too high and has to be reduced further, if possible to less than 100 vol.ppm or even better is less than 50 vol.ppm. The selective oxidation of carbon monoxide to carbon dioxide on suitable catalysts is usually used for this purpose. Selective oxidation is also called preferential oxidation, abbreviated to PROX. The problem with PROX is the possibility that, due to insufficient selectivity, a certain fraction of the hydrogen is also oxidized to water and thus is no longer available as a fuel gas for the fuel cell. To solve this problem, there is an alternative possibility of reacting the carbon monoxide with the hydrogen in the reformate gas in accordance with equation (3) to give methane (methanisation). The methanisation of carbon monoxide is inherently associated with the consumption of hydrogen unlike preferential oxidation.

$$\text{Methanisation } 3H_2 + CO \rightarrow CH_4 + H_2O \qquad (3)$$

Fuel cells with integrated gas production systems are used for supplying buildings with electrical power and heat. In the context of this invention, such a system is called a combined heat and power plant.

The hydrogen contained in the fuel gas for the fuel cell is not fully reacted at the anode of the fuel cell. Approximately 20 vol. % of the hydrogen supplied to the fuel cell leaves the fuel cell unit with the anode waste gas. The most efficient use of the primary energy carrier used, such as for example natural gas, the un-reacted hydrogen in the anode waste gas from the fuel cell is usually burnt in a gas burner to heat the steam reformer to its operating temperature.

For metering the amounts of gas required to operate the gas burners or steam reformers, gas controllers are used that measure and control the gas flow in accordance with the predetermined conditions.

Gas burners are subject to stringent safety regulations. Such as the gas burner must ensure rapid emergency shut-down of the fuel gas supply if the burner flame is extinguished, by monitoring the burner flame. Ionisation detectors are used to monitor the burner gas flame but, for problem-free operation, these require a minimum proportion of hydrocarbons in the fuel being supplied. When operating a burner with pure hydrogen, not enough ions are produced in the flame for the detector to operate effectively. Combustion of the anode waste gas in the gas burner of the steam reformer in units of the type described above which are known from the prior art therefore provides considerable problems when monitoring the burner.

Based on the forgoing there is a need in the art for a combined heat and power plant and a process that can be more cost effective and substantially simpler than those plants known in the prior art. There is also a need for a combined heat and power plant that can be operated in such a way that the safety regulations mentioned above can be observed.

SUMMARY OF THE INVENTION

The present invention provides a process and a combined heat and power plant with an integrated gas production system for the production of heat and electrical energy. In one embodiment, the present invention provides a combined heat and power plant with an integrated gas production system comprising: a) a steam reformer, wherein the steam reformer is heated with a gas burner that generates a reformate gas stream, the gas stream containing carbon monoxide and hydrogen; b) a low temperature shift reactor and a methanisation reactor downstream of the steam reformer for reducing the carbon monoxide from the reformate gas stream; c) a first heat exchanger disposed between the steam reformer and the shift reactor, the first heat exchanger capable of cooling the reformate gas stream generated from the steam reformer; d) a second heat exchanger downstream of the low temperature shift reactor capable of lowering the temperature of the reformate gas from the low temperature shift reactor to suitable operating temperature for a fuel cell unit; and e) a fuel cell unit downstream of the second heat exchanger with an operating temperature sufficient to produce electrical energy by catalytic reaction of the hydrogen contained in the reformate gas with oxygen in the fuel cell.

In a preferred embodiment, the present invention provides a process for operating a combined heat and power plant with an integrated gas production system comprising: a) converting a mixture of natural gas and water vapor into a hydrogen, carbon monoxide and methane-containing reformate gas by partial reforming in a steam reformer; b) cooling the reformate gas in a heat exchanger; c) treating the reformate gas in a low-temperature shift reactor to reduce carbon monoxide content of the reformate gas to less than 0.5 vol. %; d) further reducing the carbon monoxide in the reformate gas to a residual concentration of less than 100 vol.ppm in a methanisation reactor; and e) cooling the further reduced carbon monoxide gas to an operating temperature for a fuel cell unit.

For a better understanding of the present invention together with other and further advantages and embodiments, reference is made to the following description taken in conjunction with the examples, the scope of which is set forth in the appended claims.

BRIEF DESCRIPTION OF THE FIGURES

Preferred embodiments of the invention have been chosen for purposes of illustration and description, but are not intended in any way to restrict the scope of the invention. The preferred embodiments of certain aspects of the invention are shown in the accompanying FIGS. 1–4, wherein each figure shows a different process scheme for a combined heat and power plant.

DETAILED DESCRIPTION OF THE INVENTION

Figure 1:
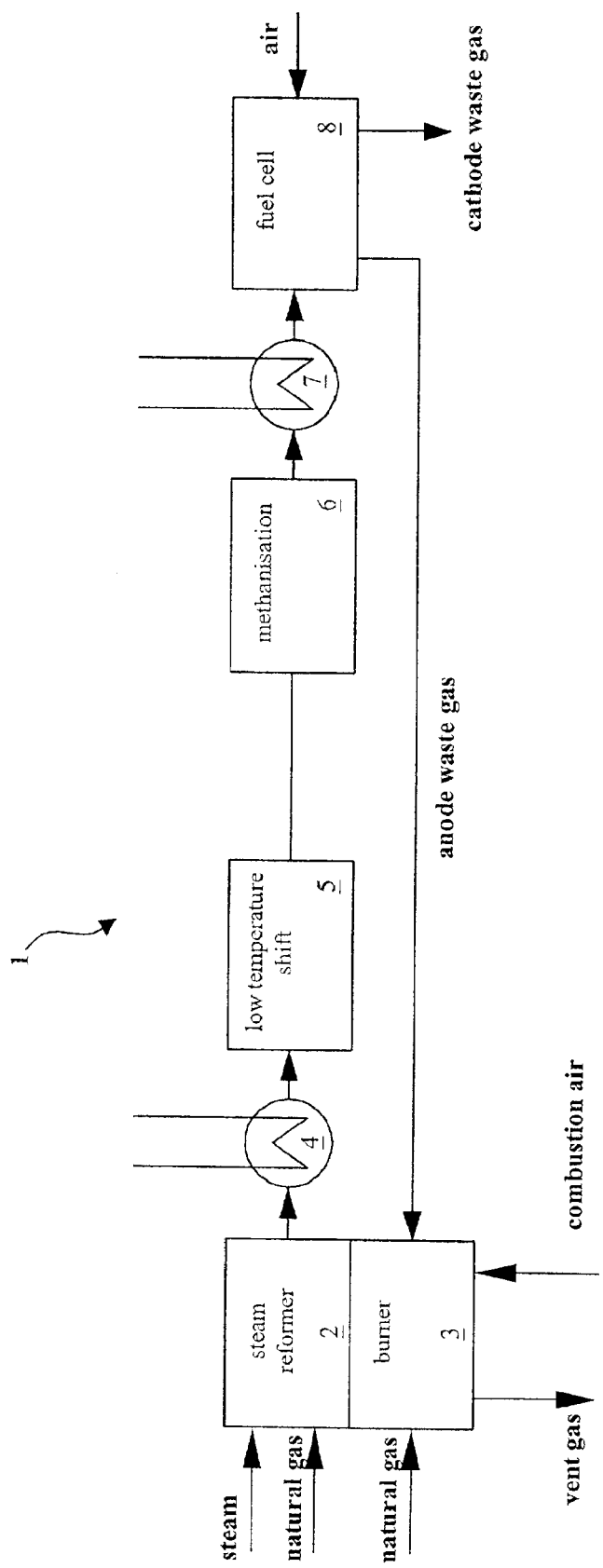
FIG. 1 illustrates a combined heat and power plant where the methanisation reactor operates at the same temperature range as the low temperature shift reactor. The temperature of the reformate leaving the methanisation reactor is lowered to the temperature of the fuel cell by a heat exchanger.

The invention will now be described in connection with preferred embodiments. These embodiments are presented to aid in an understanding of the present invention and are not intended to, and should not be construed to, limit the invention in any way. All alternatives, modifications and equivalents that may become obvious to those of ordinary skill on reading the disclosure are included within the spirit and scope of the invention.

This disclosure is not a primer on the combined heat and power plant and process thereof, basic concepts known to those skilled in the art have not been set forth in detail.

The combined heat and power plant according to the invention uses a low temperature shift reactor and an downstream methanisation reactor to remove carbon monoxide from the reformate gas stream of the steam reformer, wherein a heat exchanger for cooling the reformate gas and removing heat energy is located between the steam reformer and the low temperature shift reactor. As a result, the arrangement according to the invention is constructed in a substantially simpler and more cost-effective manner than known plants from the prior art. The methanisation reactor takes on the task of removing residual carbon monoxide from the reformate gas down to the requisite residual concentration of less than 100 vol.ppm. A methanisation reactor is substantially simpler to build and can be operated more simply than the normally used PROX reactors which require costly and precise control of the air supply for the selective oxidation of carbon monoxide.

The heat and power plant according to the invention is operated in such a way that a high enough concentration of methane is contained in the reformate gas, and thus also in the anode waste gas, to ensure the adequate production of ionisation products during combustion in the gas burner in the steam reformer so that the presence of a flame can be reliably detected with the aid of an ionisation detector. Operating temperatures in the steam reformer in the region of approximately 500 to 750° C. are required for this. The reformate emerging from the steam reformer in this case has a methane content of about 5 to 10 vol. %.

Thus the process according to the invention actually uses the less advantageous temperature range of 500° C. to 750° C. for the steam reforming process. However, the low operating temperature of the steam reformer results in a reduction in the carbon monoxide concentration in the reformate so that the conventional high temperature shift step is not required and the heat and power plant has a smaller overall size. Due to the lower maximum temperature in the steam reformer, less thermal insulation is required and the thermal power being supplied to the reformer can be set at a lower value. In addition, as a result of the reduction in the number of shift steps, there is also the advantage that the pressure loss within the heat and power plant according to the invention is reduced overall, which has a positive effect on the efficiency of the plant.

The use of a methanisation reaction to lower the concentration of carbon monoxide in the reformate also, advantageously, enables the elimination of a high-purification step for the gas, with the aid of the otherwise conventional PROX step which is used in known heat and power units to convert the residual carbon monoxide into carbon dioxide. Carbon dioxide is a gas which is inert with respect to fuel cells and which, in contrast to the additionally present hydrocarbon gas, is of no further use for the remainder of the process, whereas the hydrocarbon gas, as explained above, is extremely suitable for combustion in the gas burner. In addition, there is the fact that a PROX step requires a metered supply of external air, along with the appropriate control equipment.

Having now generally described the invention, the same may be more readily understood through the following reference to the following references, which are provided by way of illustration and are not intended to limit the present invention specified.

Embodiments of the invention are shown in more detail using FIGS. 1 to 4. The figures show four different embodiments for a combined heat and power plant (1) in accordance with the invention. The heat and power plant (1) consists of a steam reformer (2) which is heated with the aid of a burner (3). The burner is operated with natural gas in the start-up phase, whereas it is operated mainly with anode waste gas during steady-state operation. The waste gas from the burner is discharged to the surroundings. The steam reformer is supplied with natural gas and steam in order to reform natural gas.

To remove carbon monoxide from the reformate, it is passed through a low temperature shift reactor (5) which is operated at a temperature of about 180 to 250° C. A Cu/Zn shift catalyst is preferably used as catalyst in this shift reactor.

The reformate gas emerges from the steam reformer with a temperature of about 650° C. and therefore has to be cooled to the inlet temperature of the shift reactor with the aid of a heat exchanger (4) before entering the shift reactor (5). The heat energy extracted from the reformats with heat exchanger (4) is available for central heating purposes.

After leaving the shift reactor, the reformate gas still contains a concentration of carbon monoxide which corresponds to the equilibrium concentration at the outlet temperature of the shift reactor, about 180 to 250° C. At the temperatures mentioned, this is less than 0.5 vol. %. According to one embodiment of the invention, a methanisation reaction in a methanisation reactor (6) is used to further reduce the carbon monoxide concentration. A ruthenium catalyst, for example, is suitable as a methanisation catalyst.

The reformate leaving the methanisation reactor (6) is reacted with the oxygen in the fuel cell unit (8), with the production of electrical energy. The oxygen is contained in the air supplied to the cathode side of the fuel cell unit. About 80 vol. % of the hydrogen contained in the reformate is oxidised at the anode. The remaining 20 vol. % leaves the fuel cell unit with the anode waste gas, together with the constituents of the reformate gas which do not participate in the production of electrical energy in the fuel cell such as methane, nitrogen, carbon dioxide and water vapor.

The methanisation reaction proceeds at the cost of the hydrogen content of the reformate, but is substantially simpler to perform than preferential oxidation (PROX). The additionally produced methane is supplied, with the anode waste gas from the fuel cell unit (8), to the burner in the steam reformer and is burnt there with the introduction of combustion air.

Figure 2:
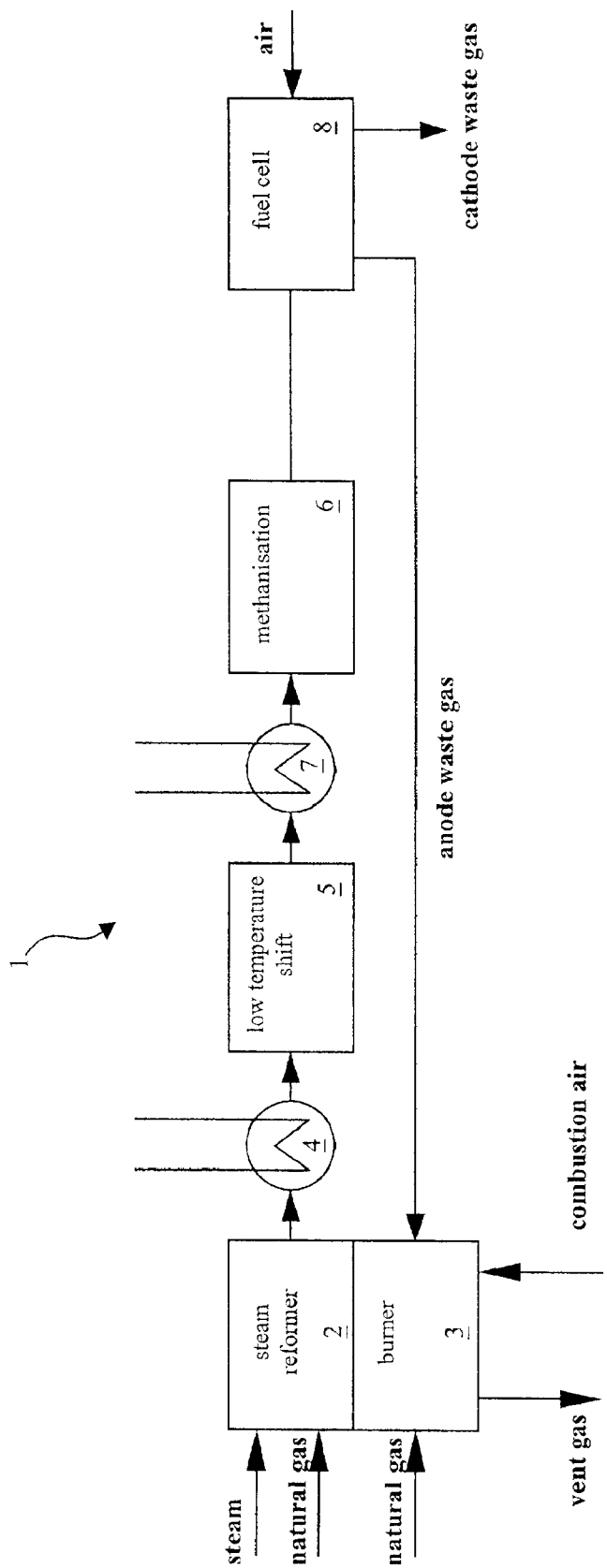
FIG. 2 illustrates a combined heat and power plant where the additional heat exchanger is located between the lower temperature shift reactor and the methanisation reactor.
Figure 3:
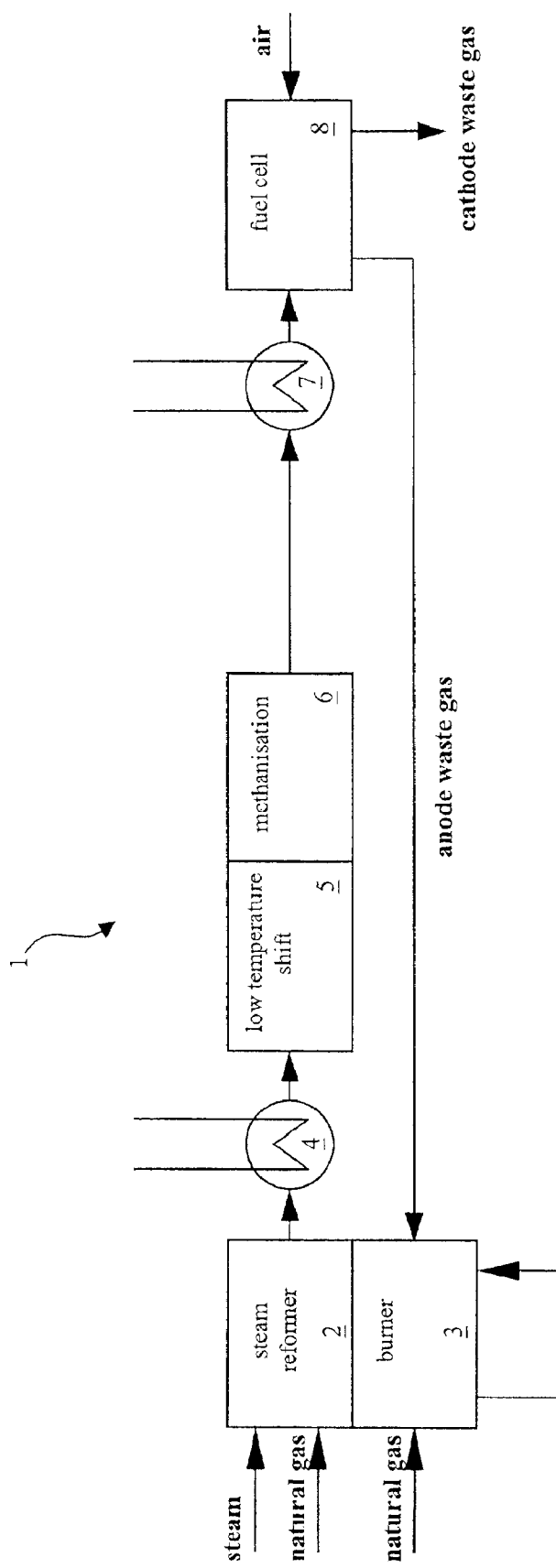
FIG. 3 illustrates a combined heat and power plant where the low temperature shift reactor and the methanisation reactor are located in sequence within the same housing.

The process schemes shown in FIGS. 1 to 3 differ with respect to the way in which the temperature of the reformate is cooled to the operating temperature of the fuel cell unit of about 60 to 80° C.

FIG. 1 shows the structure of the combined heat and power plant according to one embodiment of the present invention. Here, the methanisation reactor (6) operates within the same temperature range as the low temperature shift reactor (5). Therefore, the temperature of the reformate leaving the methanisation reactor has to be lowered to the operating temperature of the fuel cell unit (8) using a heat exchanger (7). The heat energy extracted from the reformate is again used for central heating purposes or for the production of hot water.

FIG. 2 shows another embodiment of the combined heat and power plant of the present invention. According to this process scheme, the methanisation reactor (6) is operated within the temperature range for the fuel cell unit. Therefore, in this case, the additional heat exchanger (7) has to be located between the low temperature shift reactor (5) and the methanisation reactor (6).

FIG. 3 shows another embodiment of the combined heat and power plant of the present invention. In this case, the low temperature shift reactor and the methanisation reactor are located in sequence within a single housing. This embodiment enables a very compact structure for the combined heat and power plant.

Irrespective of the process variants in FIGS. 1 to 3, the heat and power plant is operated as follows: Natural gas is used as the primary energy carrier comprising substantially methane. A mixture of natural gas and water vapour is converted to a reformate gas containing hydrogen, carbon monoxide and methane by partial reforming in the steam reformer. After cooling in the heat exchanger, this reformate gas is treated in the low temperature shift reactor to reduce the carbon monoxide content of the reformate gas to less than 0.5 vol. %. Finally, the remaining concentration of carbon monoxide in the reformate gas is reduced to a residual concentration of less than 100 vol.ppm in the methanisation reactor. The resulting product gas is supplied to the fuel cell unit as fuel gas after it has been cooled to the operating temperature of the fuel cell unit. The anode waste gas from the fuel cell unit is then used as fuel for the gas burner in the steam reformer.

Partial reforming of the natural gas/water vapour mixture is preferably performed by adjusting the operating temperature of the steam reformer so that the reformate gas still contains at least 5 to 10 vol. % of methane. This methane concentration can be provided by appropriate lowering of the operating temperature of the steam reformer to values between about 500 and 750° C. Due to partial reforming, the concentration of carbon monoxide in the reformate gas is lower than in the case of complete reforming, so an downstream low temperature shift reactor is sufficient to lower the concentration of carbon monoxide in the reformats gas to less than 0.5 vol. %. In the case of complete reforming of the natural gas/water vapour mixture, the reformate contains about 10 vol. % of carbon monoxide. The only partially reformed gas mixture in accordance with the invention contains less than 5 vol. % of carbon monoxide.

In accordance with the suggested process, the anode waste gas returned as fuel gas for the gas burner in the steam reformer contains a large enough quantity of methane for the presence of a flame to be clearly indicated using an ionisation detector.

The process can be operated in a self-stabilising or self-regulating manner due to returning the anode waste gas to the burner in the steam reformer. If the efficiency of reforming rises, due to too high a burner temperature, and the methane concentration in the reformate thus decreases, less methane is returned to the burner in the anode waste gas and this results in a reduction in the heating capacity and thus to a decrease in the efficiency of reforming. Conversely, if the methane concentration in the reformate increases due to the reforming temperature being low, then the higher methane concentration in the anode waste gas leads to an increase in the heating capacity of the burner and thus to amplification of the reforming process. Thus, the process has a negative feed-back effect which, with corresponding damping of the system, leads to the process assuming a stable operating point. A particular advantage of this process variant is the fact that, due to this inherent self-regulating effect, the burner does not have to be supplied with natural gas and thus a separate gas controller is not required for this.

The suggested process describes continuous operation of the heat and power plant. When starting-up the plant, the gas burner in the steam reformer is initially operated with external natural gas and combustion air. Only after reaching the operating temperature of the plant can the external supply of the gas burner with natural gas be terminated and the gas burner is then operated exclusively with the anode waste gas from the fuel cell unit. During the start-up phase, safe burner monitoring by means of an ionisation detector is ensured by operating the burner with external natural gas. However, exclusive operation of the burner with anode waste gas is also inherently safe because due to the described process management the anode waste gas always contains a sufficient concentration of methane.

Figure 4:
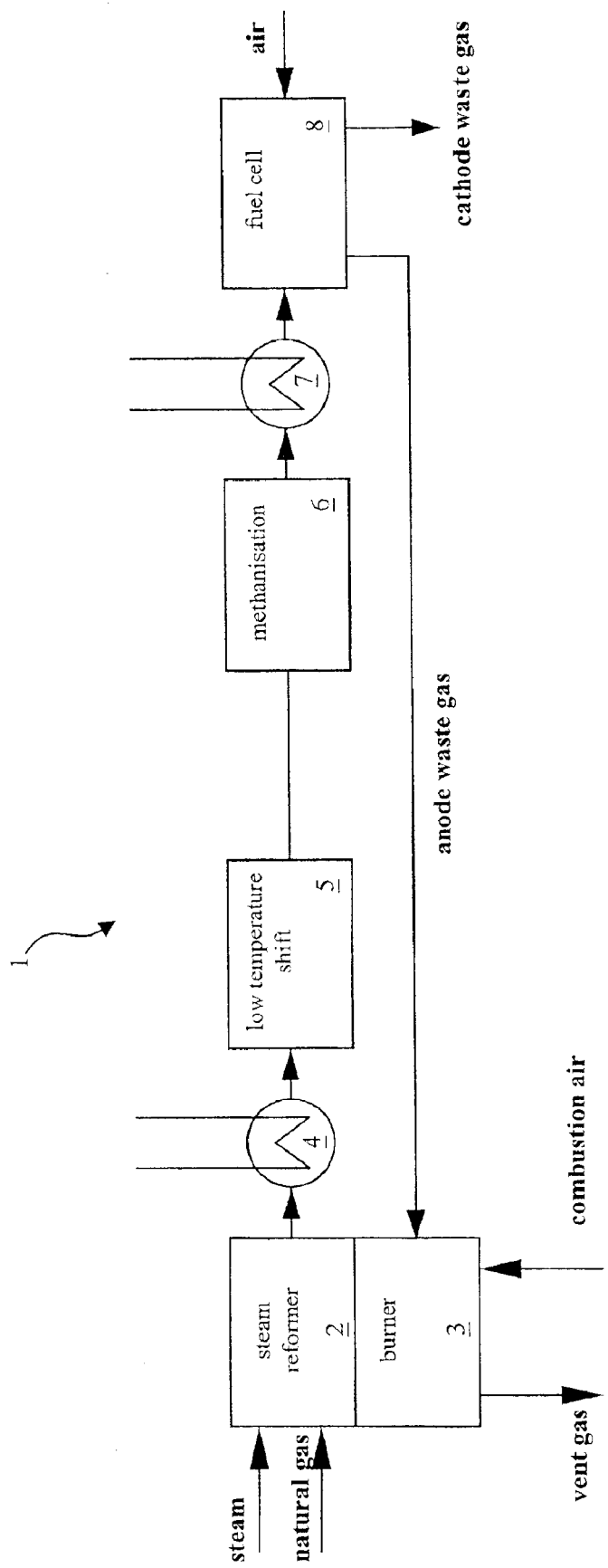
FIG. 4 illustrates a variant combined heat and power plant in FIG. 1 where the burner of the steam reformer operates without any external natural gas supply, even when starting-up the combined heat and power plant.

This characteristic of the process according to the invention enables the burner of the steam reformer to operate without any external natural gas supply at all, even when starting-up the combined heat and power plant. This particularly preferred variant is shown in FIG. 4 for the process scheme shown in FIG. 1. However, the embodiments in FIGS. 2 and 3 can also be operated in this way. During the start-up phase for the steam reformer from room temperature, the natural gas initially passes through the reformer unchanged and is returned to the burner with the anode waste gas. The burner then operates during the start-up phase with its full heating capacity. As the temperature of the steam reformer increases, the methane concentration in the reformate decreases in favour of hydrogen and the heating capacity of the burner decreases until a stable operating status is achieved.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed:

1. A process for operating a combined heat and power plant with an integrated gas production system comprising:
   a. converting a mixture of natural gas and water vapor into a hydrogen, carbon monoxide and methane-containing reformate gas by partial reforming in a steam reformer, wherein the steam reformer is heated with a gas burner that is monitored with an ionisation detector;
   b. cooling the reformate gas in a heat exchanger;
   c. treating the reformate gas in a low-temperature shift reactor to remove carbon monoxide from the reformate gas to less than 0.5 vol. %;
   d. further removing the carbon monoxide from the reformate gas to a residual concentration of less than 100 vol. ppm in a methanisation reactor; and
   e. cooling the resulting reformate in step (d) to an operating temperature for a fuel cell unit.

2. A process according to claim 1, wherein an anode waste gas from the fuel cell unit is supplied as fuel for the gas burner in the steam reformer.

3. A process according to claim 2, wherein the partial reforming of the mixture in the steam reformer is controlled by adjusting the operating temperature of the steam reformer, so that the reformate gas contains at least 5 to 10 vol. % of methane.

4. A process according to claim 3, wherein the low temperature shift reactor is run at a temperature between about 180 and about 250° C.

5. A process according to claim 4, wherein the methanisation reactor is run at the temperature of the low temperature shift reactor and the temperature of the reformate gas downstream of the methanisation reactor is lowered to about 60° C. to about 90° C.

6. A process according to claim 4, where the low temperature shift reactor and the methanisation reactor are located in sequence within one housing.

7. A process according to claim 4, wherein the methanisation reactor is run at the operating temperature of the fuel cell unit and the temperature of the reformate is lowered to the temperature of the fuel cell unit prior to entrance to the methanisation reactor.

8. A process according to claim 1, wherein the process is operated in a self-regulating manner.

9. A combined heat and power plant with an integrated gas production system comprising:
   a. a steam reformer, that generates a reformate gas stream, the gas stream comprising carbon monoxide and hydrogen;
   b. a gas burner having a flame for providing heat to the steam reformer;
   c. a low temperature shift reactor downstream of the steam reformer for removing carbon monoxide from the reformate gas stream;
   d. a methanisation reactor downstream of the low temperature shift reactor for removing carbon monoxide from the reformate gas stream;
   e. a first heat exchanger disposed between the steam reformer and the shift reactor, the first heat exchanger capable of cooling the reformate gas stream generated from the steam reformer;
   f. a second heat exchanger downstream of the low temperature shift reactor capable of lowering the temperature of the reformate gas stream from the low temperature shift reactor to a suitable operating temperature for a fuel cell unit;
   g. a fuel cell unit downstream of the second heat exchanger with an operating temperature sufficient to produce electrical energy by catalytic reaction of the hydrogen contained in the reformate gas stream with oxygen in the fuel cell; and
   h. an ionisation detector to monitor the flame in the gas burner.

10. A combined heat and power plant according to claim 9, wherein the steam reformer converts a mixture of hydrocarbons and water vapour into the reformate gas stream comprising hydrogen and carbon monoxide.

11. A combined heat and power plant according to claim 9, wherein the reformate gas stream is supplied to an anode in the fuel cell unit and an anode waste gas is generated by the fuel cell unit and is used as fuel in the gas burner.

12. A combined heat and power plant according to claim 9, wherein the combined heat and power plant uses natural gas.

13. A combined heat and power plant according to claim 9, wherein the low temperature shift reactor contains a Cu/ZnO shift catalyst.

14. A combined heat and power plant according to claim 9, wherein the methanisation reactor contains a ruthenium-containing catalyst.

* * * * *